United States Patent
Braden et al.

(10) Patent No.: US 11,311,145 B2
(45) Date of Patent: Apr. 26, 2022

(54) BROIL BURNER VENTURI COVER

(71) Applicants: BSH Home Appliances Corporation, Irvine, CA (US); BSH Hausgeräte GmbH, Munich (DE)

(72) Inventors: Ben Braden, Lafollette, TN (US); Daniel Davison, Knoxville, TN (US); Timothy Russell, Jacksboro, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 233 days.

(21) Appl. No.: 16/693,413

(22) Filed: Nov. 25, 2019

(65) Prior Publication Data

US 2021/0153690 A1    May 27, 2021

(51) Int. Cl.
*A47J 37/06* (2006.01)
*F24C 15/00* (2006.01)

(52) U.S. Cl.
CPC ......... *A47J 37/0682* (2013.01); *F24C 15/007* (2013.01)

(58) Field of Classification Search
CPC ............................ A47J 37/0682; F24C 15/007
USPC .......................................... 126/315, 14, 39 R
See application file for complete search history.

(56) References Cited

U.S. PATENT DOCUMENTS

| | | | |
|---|---|---|---|
| 1,225,769 A | 5/1917 | Chambers | |
| 2,464,084 A * | 3/1949 | Helt ........................ | F23J 13/04 126/315 |
| 3,422,810 A * | 1/1969 | Weiss ..................... | F24C 3/087 126/41 R |
| 3,624,742 A * | 11/1971 | Hurko ................. | F24C 15/2007 126/39 D |
| 9,134,034 B2 | 9/2015 | Han et al. | |
| 9,562,694 B2 | 2/2017 | Paller et al. | |
| 2012/0266862 A1* | 10/2012 | Ryu ........................ | F23D 14/64 126/39 R |
| 2013/0000878 A1* | 1/2013 | Janzer ...................... | F28F 1/24 165/182 |

FOREIGN PATENT DOCUMENTS

CA        2692384 C      8/2011

* cited by examiner

*Primary Examiner* — Avinash A Savani
(74) *Attorney, Agent, or Firm* — Michael T. Tschupp; Andre Pallapies; Brandon G. Braun

(57) ABSTRACT

A cooking appliance having a broiler may include a housing defining an upper compartment above the broiler and a rear compartment behind the broiler. A gas mixing pipe extends through the upper compartment to the rear compartment via an opening in an interior wall of the housing. A cover is removably coupled to an outer surface of the interior wall, such that opposing U-shaped slots of the two cover portions collectively form an aperture that conforms to an outer periphery of the gas mixing pipe. Accordingly, the cover blocks one or more gaps in the interior wall, such that the cover is configured to prevent gases from passing into the rear compartment through the gaps.

17 Claims, 7 Drawing Sheets

BROIL BURNER VENTURI COVER

FIELD

This disclosure relates to systems and methods for gas delivery to broiler components of cooking appliances.

INTRODUCTION

Gas ranges and ovens are widely used in the culinary arts for their excellent baking and broiling properties. Gas burners provide high heat and steady temperature, while allowing for excellent temperature control and an instant on-and-off operation with little residual heat. Baking and broiling elements included in gas ovens are similar to those included in electric ovens. However, the gas features may have different configurations, e.g., based on a need to supply gas heating elements with a combustible fuel and air mixture, and a need to produce a plurality of discrete flames along the elements for even oven-cavity heating.

Gas burner and broiler elements are typically fueled by a mixture of gas, injected into a gas mixing pipe by a gas nozzle, and ambient air, taken from behind the oven cavity. The air-to-gas ratio is controlled to provide complete fuel combustion and to precisely control oven heating temperature. Gas burner and broiler operation produce undesirable combustion byproducts, which collect within the oven cavity. Combustion byproducts in the oven cavity will find a means to escape, including by way of any inadequately-sealed seams or junctions between oven cavity components.

There exists a need for a sealing mechanism for seams or gaps between panels included in gas cooking appliances to maximize oven efficiency and safety.

SUMMARY

The present disclosure provides systems, apparatuses, and methods relating to gas broilers and the prevention of flame droop.

In some embodiments, cooking appliance may include: an oven cavity; a housing external to the cavity, the housing defining an upper compartment above the oven cavity and a rear compartment behind the oven cavity; a broil burner disposed within the oven cavity; a gas mixing pipe coupled to the broil burner and extending through the upper compartment to the rear compartment via an opening in an interior wall of the housing, wherein the opening defines one or more gaps around an outer diameter of the gas mixing pipe and the gas mixing pipe is configured to deliver a fuel mixture to the broil burner; and a cover removably coupled to an outer surface of the interior wall, the cover including a first cover portion having a first U-shaped slot and disposed adjacent the interior wall, and a second cover portion having a second U-shaped slot and disposed adjacent the first cover portion, such that the first cover portion is at least partially disposed between the second cover portion and the interior wall; wherein the first and second U-shaped slots of the cover portions collectively define an aperture configured to receive the gas mixing pipe therethrough, such that the aperture conforms to the outer diameter of the gas mixing pipe and the cover blocks the one or more gaps, such that the cover is configured to prevent gases from passing into the rear compartment through the gaps.

In some embodiments, a method of preventing flame droop in a broiler may include: coupling a first cover portion of a metal cover to a wall of an oven housing, such that a gas mixing pipe of the broiler extends through a first U-shaped slot in the first cover portion; and coupling a second portion of the metal cover to the wall of the oven housing, such that the gas mixing pipe extends through a second U-shaped slot in the second cover portion, wherein the first and second portions of the metal cover are separate from each other when not installed; wherein the first and second U-shaped slots collectively define an aperture conforming to an outer diameter of the gas mixing pipe, and the metal cover blocks one or more gaps in the wall, such that the metal cover is configured to prevent gases from passing into a rear compartment of the oven housing through the gaps.

In some embodiments, a cooking appliance may include: a housing defining an upper compartment above a broiler and a rear compartment behind the broiler; a gas mixing pipe coupled to a broil burner of the broiler and extending through the upper compartment to the rear compartment via an opening in an interior wall of the housing, wherein the opening defines one or more gaps around an outer diameter of the gas mixing pipe; and a cover removably coupled to an outer surface of the interior wall, the cover including a first cover portion having a first U-shaped slot and disposed adjacent the interior wall, and a second cover portion having a second U-shaped slot and disposed adjacent the first cover portion, such that the first cover portion is at least partially disposed between the second cover portion and the interior wall; wherein the first and second U-shaped slots of the cover portions collectively define an aperture configured to receive the gas mixing pipe therethrough, such that the aperture conforms to the outer diameter of the gas mixing pipe and the cover blocks the one or more gaps, such that the cover is configured to prevent gases from passing into the rear compartment through the gaps.

Features, functions, and advantages may be achieved independently in various embodiments of the present disclosure, or may be combined in yet other embodiments, further details of which can be seen with reference to the following description and drawings.

DETAILED DESCRIPTION

Figure 1:
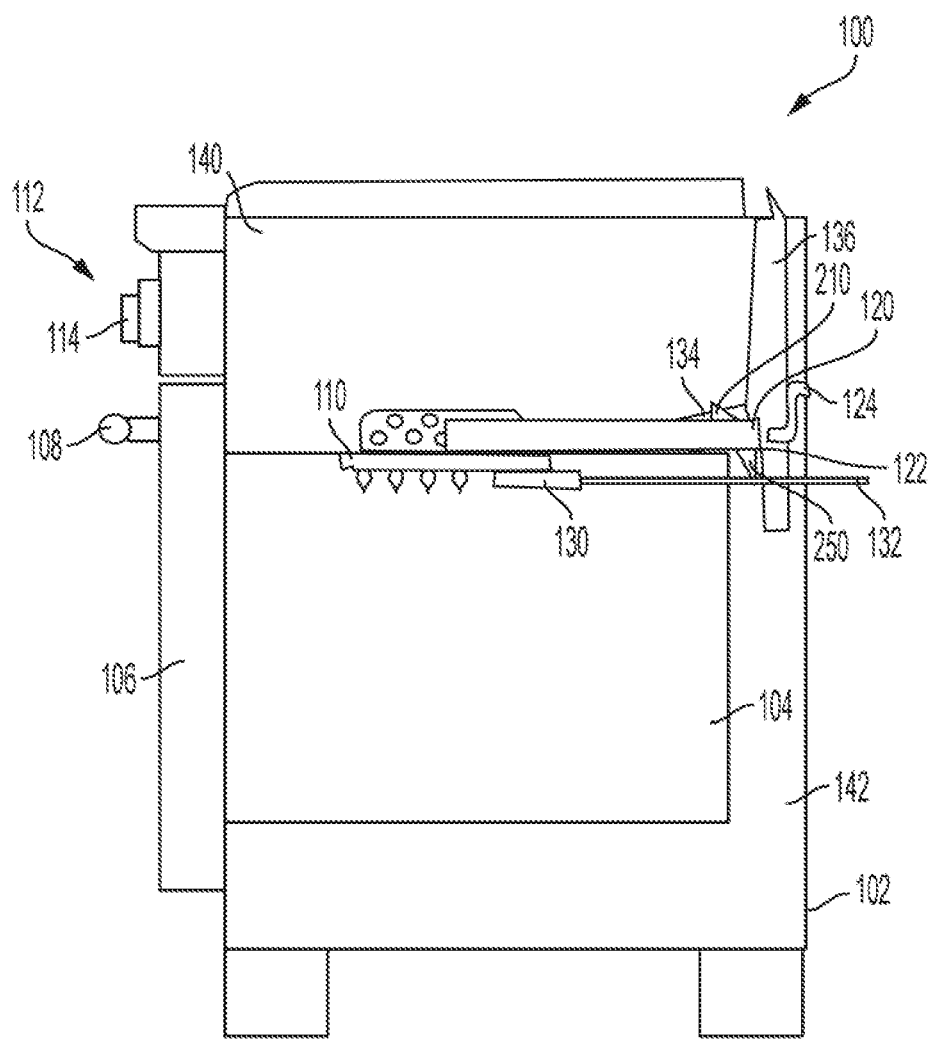
FIG. 1 is a schematic diagram of an illustrative gas oven including a venturi cover in accordance with aspects of the present disclosure.
Figure 2:
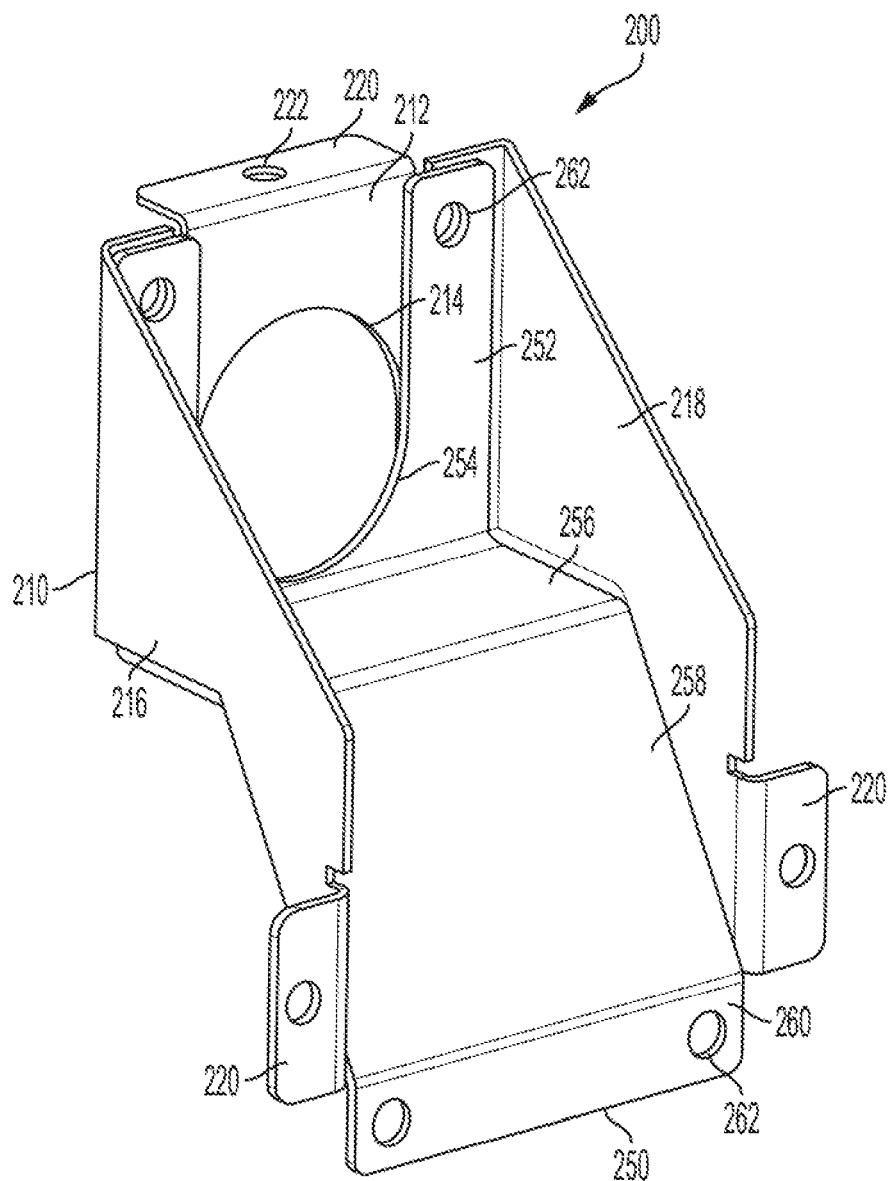
FIG. 2 is an isometric view of an illustrative venturi cover according to the present disclosure.
Figure 3:
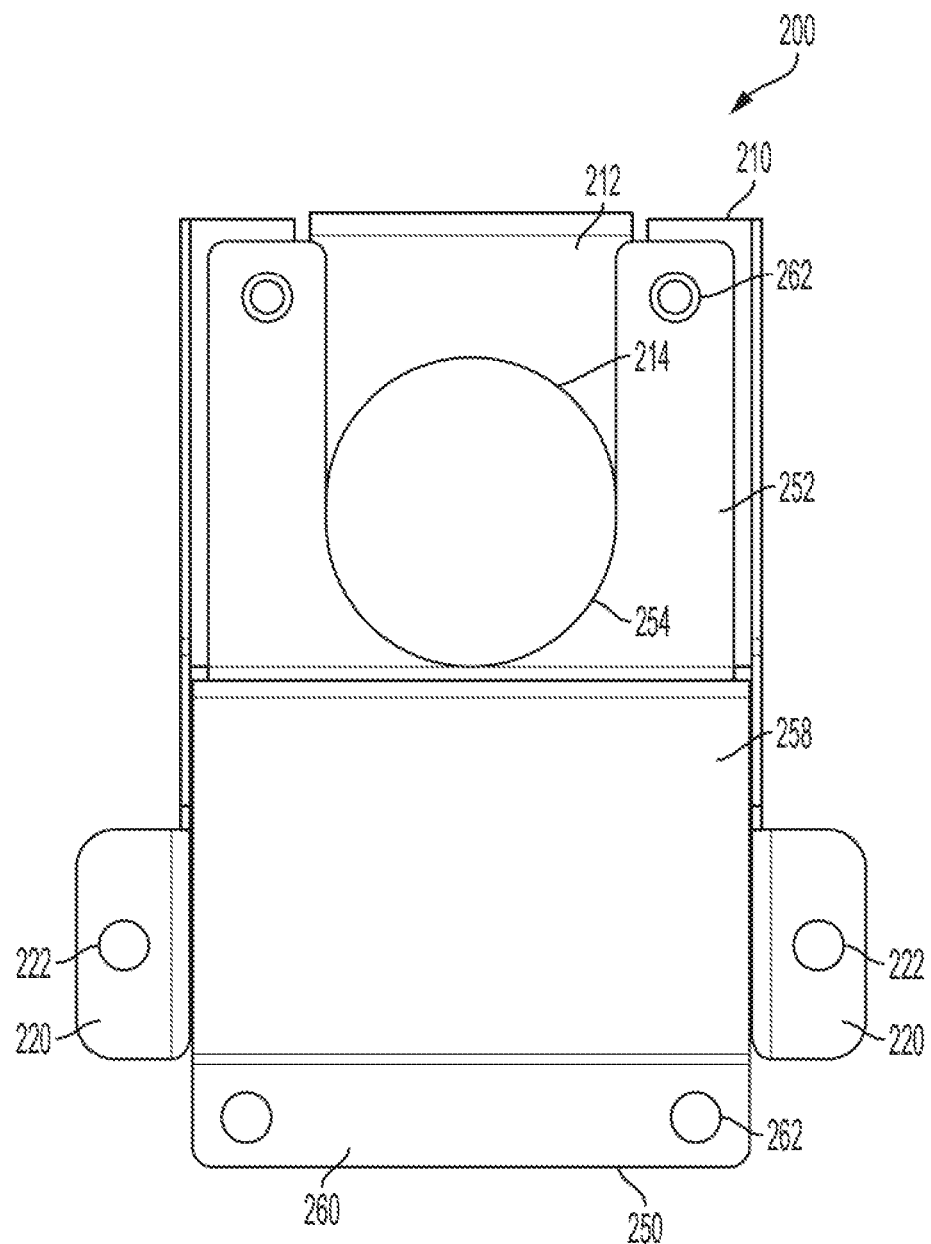
FIG. 3 is a front elevation view of the illustrative venturi cover of FIG. 2.
Figure 4:
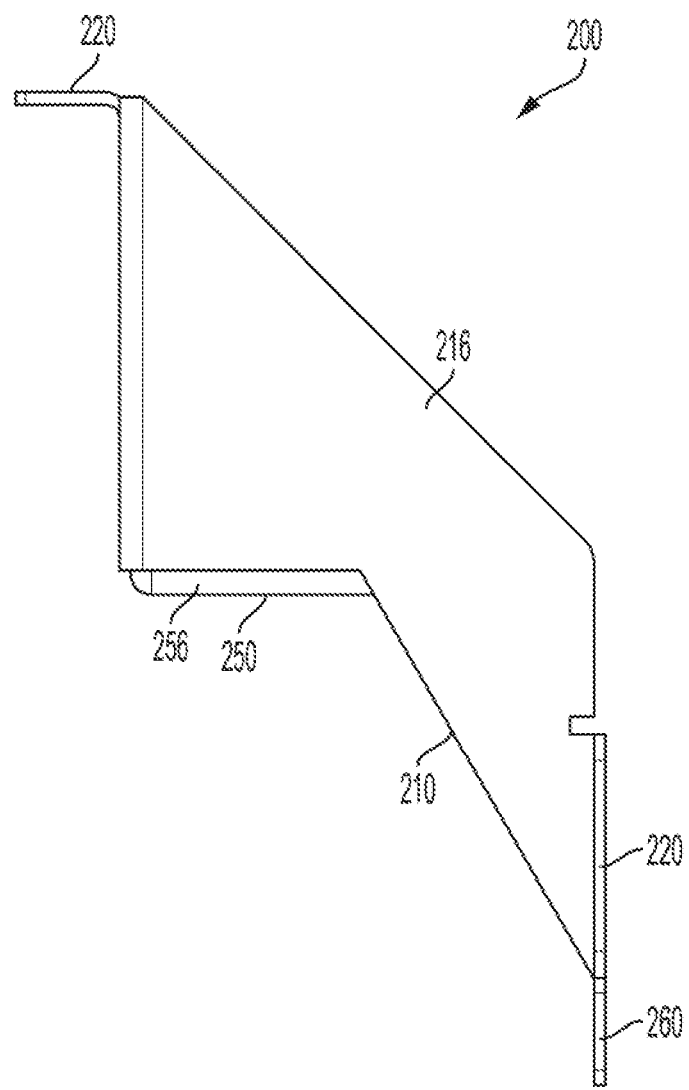
FIG. 4 is a side elevation view of the illustrative venturi cover of FIG. 2.
Figure 5:
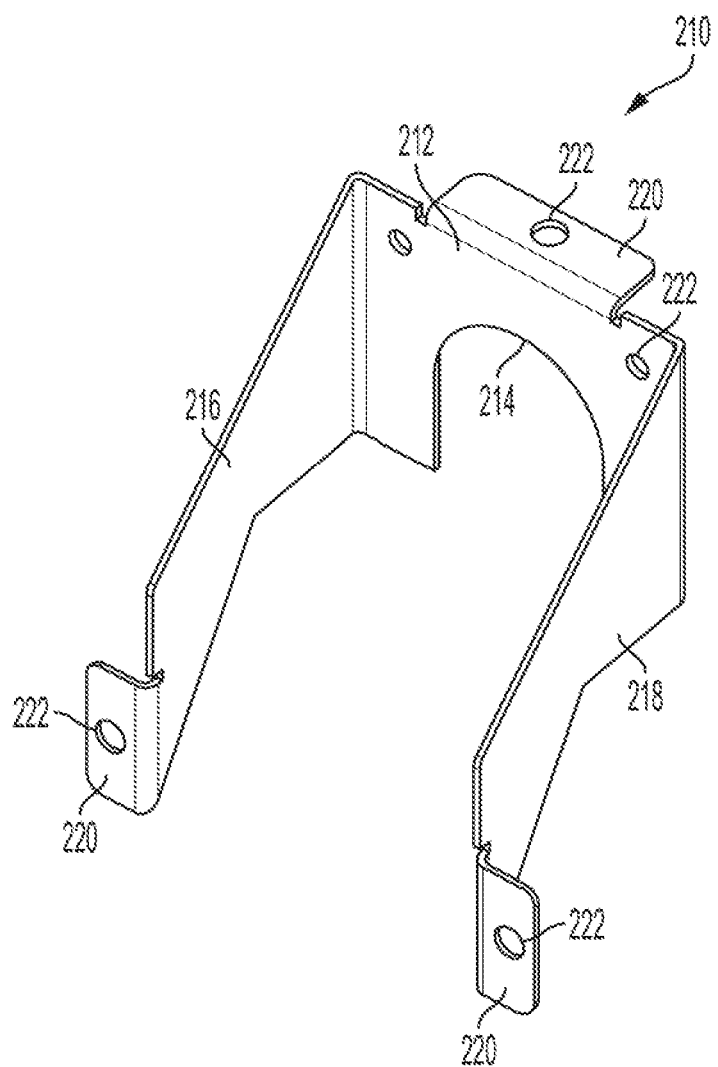
FIG. 5 is a partial isometric view of the illustrative venturi cover of FIG. 2.
Figure 6:
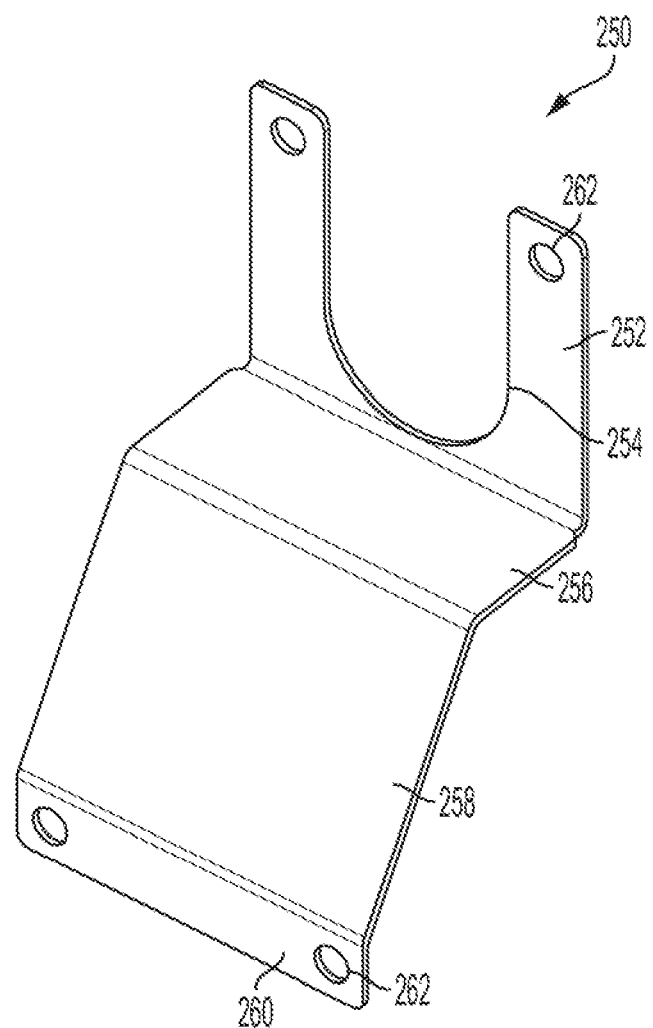
FIG. 6 is a partial isometric view of the illustrative venturi cover of FIG. 2.

In some gas ranges and ovens, combustion byproducts escape the oven cavity in gaps between the oven cavity and the broil burner interface. These combustion byproducts then mix with the primary air for the burner, degrading burner performance and causing incomplete combustion of the burner fuel.

Symptoms of decreased burner performance may include "flame droop," which is caused by a lack of primary air in the burner. This lack of air may cause flames of the radiant burners to extend downward off the burner as they seek more air to complete fuel combustion. This decreases burner efficiency and reduces a desired evenness of heating. Symptoms of decreased burner performance may also include high carbon monoxide (CO) output, as a result of incomplete fuel combustion. High CO values are a safety hazard for users of the gas oven, as well as an indicator of low oven efficiency.

Various aspects and examples of a venturi cover configured to address the problem of decreased burner performance in this context are described below and illustrated in the associated drawings. Unless otherwise specified, a venturi cover in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A and B, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

Overview

In general, a venturi cover in accordance with the present teachings may include one or more shaped metal components configured to prevent combustion byproducts from leaking into a gas mixing pipe, interchangeably referred to as a venturi or venturi pipe. The venturi cover may be formed as a single piece or may include two or more pieces which fit together. The venturi cover is configured to provide a seal between an oven cavity and an air intake area of a gas cooking appliance. The venturi cover includes a hole or aperture configured to surround the gas mixing pipe. In some embodiments, the venturi cover is specifically configured to cover one or more seams between oven components. The venturi cover may include a plurality of wings or appendages configured to obstruct or seal gaps or seams between panels of the appliance housing. Some of the wings may be configured to provide attachment areas or structural support to the venturi cover.

In some embodiments, the venturi cover may include an inner (i.e., first) cover and an outer (i.e., second) cover. The inner cover is configured to directly contact a housing of the gas cooking appliance, while the outer cover is configured to partially overlay the inner cover, such that the inner cover is intermediate (i.e., between) the outer cover and the appliance housing. Each cover component may include a plurality of attachment holes configured to receive corresponding fasteners (e.g., screws, pins, and/or the like). The inner cover and the outer cover may include complementary attachment holes, such that a single fastener may be inserted through an attachment hole of the outer cover, an attachment hole of the inner cover, and an attachment hole included in the appliance housing.

A method for sealing gaps in a cooking appliance housing may include manufacturing or otherwise providing a venturi cover including panels configured to obscure gaps or seams between panels of the cooking appliance and coupling the venturi cover to the appliance housing using one or more suitable fasteners.

Examples, Components, and Alternatives

The following sections describe selected aspects of exemplary venturi covers as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Gas Cooking Appliance

As shown in FIG. 1, this section describes an illustrative gas cooking appliance 100. Gas cooking appliance (e.g., gas oven or gas range) 100 includes appliance cavity 104 (e.g., oven cavity) and an appliance housing 102 external to the appliance cavity. The housing defines an upper compartment 140 disposed above the oven cavity, which may be configured to contain circuitry and/or piping associated with burner function, broiler function, and/or any suitable hardware associated with appliance functions. The housing defines a rear compartment 142 disposed behind the oven cavity, which is configured to provide an air source for burners associated with the gas cooking appliance. The upper compartment and the rear compartment are separated by an interior wall of housing 102. Housing 102 includes an opening in a front surface of the housing to allow oven cavity access. The housing may further include a door 106, pivotably coupled to the front surface of the housing, such that the door is configured to selectively open and close the opening of the cavity. Door 106 may include a handle 108 disposed on a front surface.

Gas cooking appliance 100 includes a broil burner 110 (AKA a broiler) disposed adjacent a top surface of the oven cavity. Broiler 110 may include any suitable gas burner configured to heat the interior of the cooking appliance to a selected temperature. The appliance may further include additional heating elements disposed adjacent a bottom surface of the oven cavity, to provide additional heat for convection cooking, oven cleaning, etc. Upper compartment 140 and rear compartment 142 of housing 102 are disposed above the broiler and behind the broiler, respectively.

As a gas burner, broil burner 110 is configured to heat the interior of the cooking appliance by combusting a gas and air mixture (AKA a fuel mixture) delivered to the burner through a gas mixing pipe 120. Gas mixing pipe 120 delivers air, delivered through an air intake 122, and gas, delivered through a gas supply pipe 124, to the broiler. The gas mixing pipe is coupled to the broiler and extends above appliance cavity 104 through upper compartment 140 to the rear compartment 142 via an opening in the interior wall of the housing. In some embodiments, the opening in the interior wall may define one or more gaps around an outer diameter of the gas mixing pipe. For example, the opening may be square or some other non-circular or differently-sized shape, as compared with the gas mixing pipe. The gas-air mixture is ignited by an ignitor 130, powered by wiring 132, which produces flames extending from the broil burner into the oven cavity.

Flame size and intensity may be adjusted via a human-machine interface (HMI) in the form of one or more controls 112 disposed on a front or top surface of the gas cooking appliance. In some embodiments, gas cooking appliance 100 includes an electronic controller configured to adjust flame size as a result of predetermined values input by a user or calculated by the control system. In some embodiments, controls 112 include a plurality of adjustment knobs or dials 114. A user may rotate one of knobs 114, increasing a flow rate of gas through gas supply pipe 124.

Cooking appliance 100 may include a combustion byproduct diverter 134, which collects byproducts produced during appliance function and directs the byproducts toward a vent 136. Diverter 134 may extend between the oven cavity and the vent, which is disposed behind the oven cavity. The vent may collect byproducts from the diverter and deliver them to either an external oven vent or to an oven hood.

In some embodiments, housing 102 may include multiple panels defining different surfaces. Junctions or seams are formed between the panels, which include gaps through which gases can pass. In other embodiments, the panels include holes, apertures, and/or openings configured to allow passage of other appliance components such as pipes or burners. Interfaces between the components and these openings may be imperfect, therefore forming gaps. During appliance use, combustion byproducts such as carbon monoxide may escape through the seams and gaps, reducing oven function and potentially causing a safety concern.

A venturi cover 200 of the present disclosure is configured to cover one or more of these gaps within the appliance housing. Cover 200 includes an inner cover 210 and an outer cover 250, configured to collectively prevent combustion byproducts leaving the oven housing through gaps other than diverter 134.

B. Illustrative Venturi Cover and Method

As shown in FIGS. 2-6, this section describes an illustrative venturi cover 200. Illustrative venturi cover 200 includes an inner (i.e., first) cover or cover portion 210 and an outer (i.e., second) cover or cover portion 250. The inner and outer covers may collectively cover or obscure seams, gaps, or holes of an appliance housing to which the covers are mounted.

Inner cover 210 includes an inner cover body 212 mountable to an interior wall (e.g., on an outer surface of the interior wall) of the appliance housing. Inner cover body 212 includes a flat plate having a generally rectangular perimeter, and a pair of wings extending in a same direction away from opposite side edges of the flat plate. Specifically, a first wing 216 and second wing 218 are each extend transverse to the side edges, in a downward slanting direction. The wings are configured to contact side walls of the mixing tube recess. In some embodiments, wings 216 and 218 may be trapezoidal, triangular, rectangular, or any suitable shape configured to contact side walls of the mixing tube recess.

Inner cover body 212 is configured to be coupled to a rear wall (by the flat plate) and to side walls of a mixing tube recess (by the wing portions) of the appliance housing. The flat plate of inner cover body 212 is configured to be disposed vertically when installed. Inner cover body 212 includes an open-mouthed, U-shaped cutout or aperture 214 configured to partially contact a gas mixing tube received therethrough. A terminal end of aperture 214 may be substantially semi-circular. In some embodiments, aperture 214 may be a circular hole rather than an open-ended slot.

Wings 216 and 218 may be configured to prevent contact with one or more surfaces of the mixing tube recesses, such as lower walls or panels included within the main appliance housing, by including apertures, holes, or recesses formed within the inner cover.

Inner cover body 212 further includes a plurality of attachment or mounting tabs 220, which extend transversely from edges of cover body 212 as well as wings 216 and 218. These tabs are configured to provide mounting features for interfacing with surfaces orthogonal to the rear and side walls of the mixing tube recess. In some examples, the attachment tabs wrap around corners between panels of the attachment housing. Some or all of attachment tabs 220 and/or inner cover body 212 may include attachment holes 222, configured to receive suitable fasteners.

Inner cover 210 is configured to be disposed between the appliance housing and outer cover 250. Outer cover 250 includes an outer cover body 252, which is configured to mate with inner cover 210, overlaying portions of inner cover 210 and portions of the underlying appliance housing (e.g., an outer surface of an interior wall), such that the inner cover is at least partially disposed between the outer cover and the appliance housing. As shown in the drawings, outer cover 250 may at least partially nest with inner cover 210. Outer cover 250 is configured to cover or obscure seams disposed on bottom walls of the mixing tube recess, as well as adjacent housing panels.

Outer cover body 252 includes a U-shaped plate configured to be oriented vertically when installed, and to be disposed substantially parallel to and in contact with inner cover body 212. Outer venturi cover 250 includes a U-shaped cutout or aperture 254 configured to partially contact the gas mixing tube received therethrough. As with aperture 214, a terminal end of aperture 254 may be substantially semi-circular, and may contact (in this case) a bottom surface of the gas mixing tube. In some embodiments, aperture 254 may be a circular hole, rather than an open-ended slot.

U-shaped cutout 214 of the inner venturi cover and U-shaped cutout 254 of the outer venturi cover may collectively define an aperture configured to receive the gas mixing tube therethrough, such that the aperture conforms to an outer diameter of the gas mixing pipe. The venturi cover blocks gaps between the gas mixing pipe and the appliance housing, such that the cover is configured to prevent gases from passing between compartments in the appliance housing through the gaps (e.g., between the upper compartment and the rear compartment). U-shaped cutout 214 and U-shaped cutout 254 may be oriented in opposing directions with respect to each other when installed.

Outer cover body 252 further includes a front housing portion 256 extending outward at a substantially right angle from a bottom edge of the U-shaped plate. Portion 256 extends orthogonally to an angled support panel 258 extending diagonally downward from portion 256. The support panel may include one or more attachment or mounting tabs 260 extending from edges of the support panel. Each attachment tab may include one or more attachment holes 262, configured to receive suitable fasteners. Outer cover body 252 may include attachment holes 262, which may be configured to align with attachment holes 222 of the inner cover body in an installed position such that a single respective fastener may be received through an aligned pair of holes.

Figure 7:
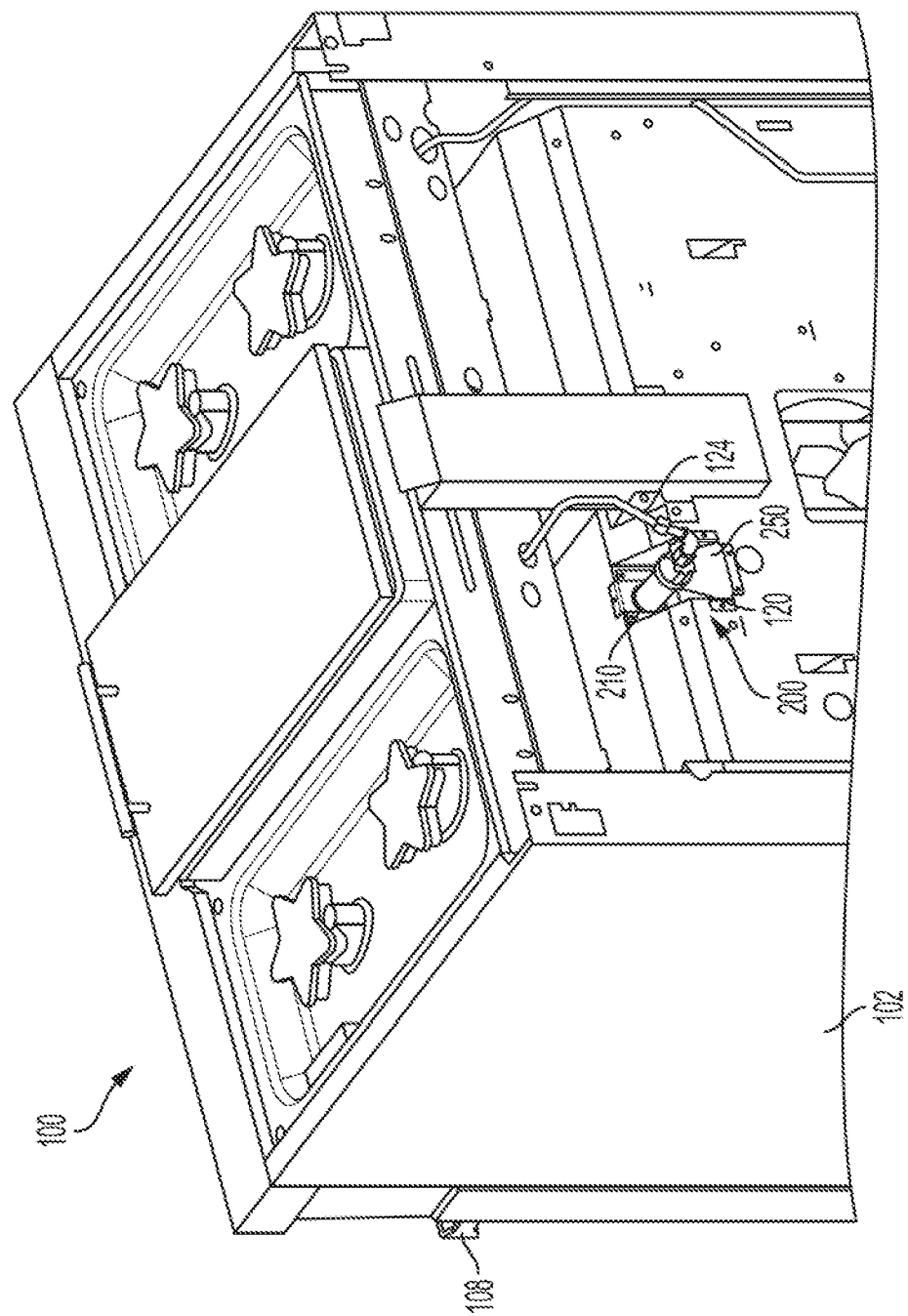
FIG. 7 is a rear isometric view of an illustrative gas oven including a venturi cover according to the present disclosure.

FIG. 7 depicts venturi cover 200 installed on a gas cooking appliance 100, as described above. Venturi cover 200 is installed around gas mixing pipe 120, such that venturi cover 200 blocks at least some gaps between adjacent panels of appliance housing 102. Appliance housing 102 may include a plurality of attachment holes configured to align with attachment holes 222 and 262 of venturi cover 200, such that the venturi cover can be removably coupled to the appliance housing.

Installing venturi cover 200 on gas cooking appliance 100 may include coupling inner venturi cover 210 to the appliance housing using suitable fasteners (e.g., pins, screws, and/or the like). Outer venturi cover 250 may then be coupled to the appliance housing, such that outer venturi cover 250 partially covers inner venturi cover 210.

Based on the above description, a method of preventing broiler flame droop may include installing a venturi cover around a gas mixing pipe. For example, a first cover portion of a venturi cover may be coupled to a wall of an oven housing, such that a gas mixing pipe of the broiler extends through a U-shaped slot in the cover portion. The first cover portion may be substantially identical to inner cover 210, described above. The first cover portion may comprise a suitable metal. Coupling the first cover portion to the oven housing may include inserting fasteners through attachment holes included in the first cover portion. In some embodiments, coupling the first cover portion to the housing may include inserting fasteners through complementary attachment holes included in the oven housing. In some embodiments, the first cover portion may include at least one mounting tab. The U-shaped slot in the cover portion may be formed in a rectangular plate of the first cover portion, which may further comprise a pair of wings extending from opposing side edges of the rectangular plate in a same direction transverse to the rectangular plate.

A second cover portion of the venturi cover may be coupled to the wall of the oven housing, such that the gas mixing pipe of the broiler extends through a U-shaped slot in the second cover portion. The second cover portion may be substantially identical to outer cover 250, described above. The second cover portion may comprise a metal. In some embodiments, the second cover portion may include at least one mounting tab. Coupling the second cover portion to the oven housing may include inserting fasteners through attachment holes included in the second cover portion. In some embodiments, the first cover portion and the second cover portion include attachment holes configured to align mutually, such that a single respective fastener is received through each aligned pair of holes. Coupling the second cover portion to the oven housing may include inserting fasteners through attachment holes included in the second cover portion, through attachment holes included in the first cover portion, and through attachment holes included in the oven housing.

The first and second cover portions may be separate from each other when not installed. In some embodiments, the first and second U-shaped slots of the first and second cover portions may collectively define an aperture conforming to an outer diameter of the gas mixing pipe. In some embodiments, the first and second U-shaped slots may be oriented in opposing directions with respect to each other when installed. The metal cover may block one or more gaps in the wall, such that the metal cover is configured to prevent gases from passing into a rear compartment of the oven housing through the gaps. In some embodiments, the oven may be mounted in a range.

The following paragraphs describe additional aspects and features of venturi covers for gas cooking appliances, presented without limitation as a series of paragraphs alphanumerically designated for clarity and efficiency.

A0. A cooking appliance comprising:
an oven cavity;
a housing external to the cavity, the housing defining an upper compartment above the oven cavity and a rear compartment behind the oven cavity;
a broil burner disposed within the oven cavity;
a gas mixing pipe coupled to the broil burner and extending through the upper compartment to the rear compartment via an opening in an interior wall of the housing, herein the opening defines one or more gaps around an outer diameter of the gas mixing pipe and the gas mixing pipe is configured to deliver a fuel mixture to the broil burner; and
a cover removably coupled to an outer surface of the interior wall, the cover including a first cover portion having a first U-shaped slot and disposed adjacent the interior wall, and a second cover portion having a second U-shaped slot and disposed adjacent the first cover portion, such that the first cover portion is at least partially disposed between the second cover portion and the interior wall;

wherein the first and second U-shaped slots of the cover portions collectively define an aperture configured to receive the gas mixing pipe therethrough, such that the aperture conforms to the outer diameter of the gas mixing pipe and the cover blocks the one or more gaps, such that the cover is configured to prevent gases from passing into the rear compartment through the gaps.

A1. The cooking appliance of A0, wherein the first and second cover portions each comprise at least one mounting tab.

A2. The cooking appliance of A0 or A1, wherein the cover includes a plurality of attachment holes.

A3. The cooking appliance of A2, wherein the cover is configured to be coupled to the housing by a plurality of fasteners received through the plurality of attachment holes.

A4. The cooking appliance of A3, wherein the first cover portion and the second cover portion include attachment holes configured to align mutually, such that a single respective fastener is received through each aligned pair of the holes.

A5. The cooking appliance of any one of paragraphs A0 through A4, wherein the cooking appliance comprises a range.

A6. The cooking appliance of any one of paragraphs A0 through A5, wherein the first and second U-shaped slots are oriented in opposing directions with respect to each other when installed.

A7. The cooking appliance of any one of paragraphs A0 through A6, wherein the first U-shaped slot is formed in a rectangular plate of the first cover portion, the first cover portion further comprising a pair of wings extending from opposing side edges of the rectangular plate in a same direction transverse to a plane of the rectangular plate.

B0. A cooking appliance comprising:

a housing defining an upper compartment above a broiler and a rear compartment behind the broiler;

a gas mixing pipe coupled to a broil burner of the broiler and extending through the upper compartment to the rear compartment via an opening in an interior wall of the housing, wherein the opening defines one or more gaps around an outer diameter of the gas mixing pipe; and a cover removably coupled to an outer surface of the interior wall, the cover including a first cover portion having a first U-shaped slot and disposed adjacent the interior wall, and a second cover portion having a second U-shaped slot and disposed adjacent the first cover portion, such that the first cover portion is at least partially disposed between the second cover portion and the interior wall;

wherein the first and second U-shaped slots of the cover portions collectively define an aperture configured to receive the gas mixing pipe therethrough, such that the aperture conforms to the outer diameter of the gas mixing pipe and the cover blocks the one or more gaps, such that the cover is configured to prevent gases from passing into the rear compartment through the gaps.

B1. The cooking appliance of B0, wherein the first and second U-shaped slots are oriented in opposing directions with respect to each other when installed.

B2. The cooking appliance of B0 or B1, wherein the first U-shaped slot is formed in a rectangular plate of the first cover portion, the first cover portion further comprising a pair of wings extending from opposing side edges of the rectangular plate in a same direction transverse to a plane of the rectangular plate.

B3. The cooking appliance of any one of paragraphs B0 through B2, wherein the second cover portion at least partially nests with the first cover portion.

Advantages, Features, and Benefits

The different embodiments and examples of the venturi cover described herein provide several advantages over known solutions for maximizing combustion efficiency in gas ovens. For example, illustrative embodiments and examples described herein allow for easy installation and removal of the venturi cover for burner servicing. Illustrative embodiments and examples allow a venturi cover to be installed over a premanufactured oven housing, and thus allow for ovens or ranges with preexisting burner problems to be fixed.

Additionally, and among other benefits, illustrative embodiments and examples described herein restrict combustion byproducts from contaminating oven fuel supply while allowing a gas mixing tube or venturi tube to extend between compartments within the oven cavity.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A cooking appliance comprising:
an oven cavity;
a housing external to the cavity, the housing defining an upper compartment above the oven cavity and a rear compartment behind the oven cavity;
a broil burner disposed within the oven cavity;
a gas mixing pipe coupled to the broil burner and extending through the upper compartment to the rear compartment via an opening in an interior wall of the housing, wherein the opening defines one or more gaps around an outer diameter of the gas mixing pipe and the gas mixing pipe is configured to deliver a fuel mixture to the broil burner; and
a cover removably coupled to an outer surface of the interior wall, the cover including a first cover portion having a first U-shaped slot and disposed adjacent the interior wall, and a second cover portion having a second U-shaped slot and disposed adjacent the first cover portion, such that the first cover portion is at least partially disposed between the second cover portion and the interior wall;

wherein the first and second U-shaped slots of the cover portions collectively define an aperture configured to receive the gas mixing pipe therethrough, such that the aperture conforms to the outer diameter of the gas mixing pipe and the cover blocks the one or more gaps, such that the cover is configured to prevent gases from passing into the rear compartment through the gaps, wherein the first and second cover portions each comprise at least one mounting tab.

2. The cooking appliance of claim 1, wherein the cover includes a plurality of attachment holes.

3. The cooking appliance of claim 2, wherein the cover is configured to be coupled to the housing by a plurality of fasteners received through the plurality of attachment holes.

4. The cooking appliance of claim 3, wherein the first cover portion and the second cover portion include attachment holes configured to align mutually, such that a single respective fastener is received through each aligned pair of the holes.

5. The cooking appliance of claim 1, wherein the cooking appliance comprises a range.

6. The cooking appliance of claim 1, wherein the first and second U-shaped slots are oriented in opposing directions with respect to each other when installed.

7. The cooking appliance of claim 1, wherein the first U-shaped slot is formed in a rectangular plate of the first cover portion, the first cover portion further comprising a pair of wings extending from opposing side edges of the rectangular plate in a same direction transverse to a plane of the rectangular plate.

8. A method of preventing flame droop in a broiler, the method comprising:

coupling a first cover portion of a metal cover to a wall of an oven housing, such that a gas mixing pipe of the broiler extends through a first U-shaped slot in the first cover portion; and coupling a second portion of the metal cover to the wall of the oven housing, such that the gas mixing pipe extends through a second U-shaped slot in the second cover portion, wherein the first and second portions of the metal cover are separate from each other when not installed;

wherein the first and second U-shaped slots collectively define an aperture conforming to an outer diameter of the gas mixing pipe, and the metal cover blocks one or more gaps in the wall, such that the metal cover is configured to prevent gases from passing into a rear compartment of the oven housing through the gaps, wherein the first and second cover portions each comprise at least one mounting tab.

9. The method of claim 8, wherein the cover includes a plurality of attachment holes.

10. The method of claim 9, wherein the cover is configured to be coupled to the wall by a plurality of fasteners received through the plurality of attachment holes.

11. The method of claim 10, wherein the first cover portion and the second cover portion include attachment holes configured to align mutually, such that a single respective fastener is received through each aligned pair of the holes.

12. The method of claim 8, wherein the oven is mounted in a range.

13. The method of claim 8, wherein the first and second U-shaped slots are oriented in opposing directions with respect to each other when installed.

14. The method of claim 8, wherein the first U-shaped slot is formed in a rectangular plate of the first cover portion, the first cover portion further comprising a pair of wings extending from opposing side edges of the rectangular plate in a same direction transverse to a plane of the rectangular plate.

15. A cooking appliance comprising:

a housing defining an upper compartment above a broiler and a rear compartment behind the broiler;

a gas mixing pipe coupled to a broil burner of the broiler and extending through the upper compartment to the rear compartment via an opening in an interior wall of the housing, wherein the opening defines one or more gaps around an outer diameter of the gas mixing pipe; and a cover removably coupled to an outer surface of the interior wall, the cover including a first cover portion having a first U-shaped slot and disposed adjacent the interior wall, and a second cover portion having a second U-shaped slot and disposed adjacent the first cover portion, such that the first cover portion is at least partially disposed between the second cover portion and the interior wall;

wherein the first and second U-shaped slots of the cover portions collectively define an aperture configured to receive the gas mixing pipe therethrough, such that the aperture conforms to the outer diameter of the gas mixing pipe and the cover blocks the one or more gaps, such that the cover is configured to prevent gases from passing into the rear compartment through the gaps, wherein the second cover portion at least partially nests with the first cover portion.

16. The cooking appliance of claim 15, wherein the first and second U-shaped slots are oriented in opposing directions with respect to each other when installed.

17. The cooking appliance of claim 15, wherein the first U-shaped slot is formed in a rectangular plate of the first cover portion, the first cover portion further comprising a pair of wings extending from opposing side edges of the rectangular plate in a same direction transverse to a plane of the rectangular plate.

* * * * *